United States Patent Office 3,145,185
Patented Aug. 18, 1964

3,145,185
CELLULAR POLYURETHANE MATERIALS AND
PROCESS FOR PREPARING SAME
Ward J. Remington, West Chester, Pa., assignor to E. I.
du Pont de Nemours and Company, Wilmington, Del.,
a corporation of Delaware
No Drawing. Filed July 7, 1958, Ser. No. 746,681
11 Claims. (Cl. 260—2.5)

This invention relates to polyurethane foams and more particularly to polyurethane foams having improved cell structure and improved load-bearing capacity.

This application is a continuation-in-part of my co-pending application Serial No. 685,816 filed September 24, 1957, now abandoned.

The technique of foamed-in-place insulation with polyisocyanates is of great potential importance today because it is versatile and economical. The foaming mixture may be sprayed onto objects with odd shapes or poured into voids of complicated form. External heat for cumbersome post-foaming cures is not required. The simplicity of the technique provides savings in labor costs. However, many of the plastic foams made from available water-foamable polysiocyanate compositions possess a cell network which is inter-connecting and permeable to vapor. The foam may be filled by warm moisture-laden air which subsequently becomes cool enough to allow water to condense. The insulating efficiency of the foam is thereby lowered. For ideal efficiency, the foam should contain air trapped in a mass of discrete, closed cells. Another problem which is encountered with foams prepared from polyisocyanates, especially resilient and plastic foams, is a need for increasing the load-bearing capacity and the tensile strength. It has been observed that the lower density foams are not as strong as their higher density analogues. Yet it is most desirable to reduce the density in order to provide economically attractive products.

This invention has an object to provide polyurethane foams having improved cell structure and improved load-bearing capacity. A further object is to provide a process for the preparation of these polyurethane foams involving the use of a water-soluble organo-silicone polymer. Other objects will appear hereinafter.

These and other objects of the present invention are accomplished by the improvement in the process for the formation of cellular materials from the reaction of water with a water-foamable polyisocyanate-polyurethane composition which comprises mixing said polyisocyanate-polyurethane composition prior to the formation of the cellular material with a water-soluble organo-silicone polymer. The cellular materials which are obtained as a result of the improved process of the present invention show an unexpected increase in discrete closed cell content over previously prepared polyisocyanate cellular materials and, in addition, display vastly improved load-bearing capacity.

In carrying out the process of the present invention, the water-soluble organo-silicone polymer is mixed with the water-foamable polyisocyanate-polyurethane composition prior to the time that this composition is foamed with water. From about 0.05 to 2.0% by weight, based on the weight of the polyisocyanate-polyurethane composition, of the water-soluble organo-silicone polymer is necessary to prepare the improved cellular materials of the present invention. In general, the use of from about 0.1 to 1.0% by weight of the organo-silicone polymer is preferred. After the organo-silicone polymer is added to the water-foamable polyisocyanate-polyurethane composition, the mixture is foamed in the usual manner by thoroughly mixing with water, usually in the presence of a catalyst. The mixture immediately begins to foam due to the liberation of carbon dioxide formed by the reaction of water with the free isocyanate groups on the polyisocyanate-polyurethane composition.

The water-foamable polyisocyanate-polyurethane compositions which are used to prepare the improved cellular materials of the present invention are compositions which are obtained by agitating an organic polyisocyanate, usually a diisocyanate, with an organic compound containing a plurality of alcoholic hydroxyl groups. The proportions of reactants are such that the overall ratio of the number of free isocyanate groups to the number of alcoholic hydroxyl groups is greater than 1.0. The reaction may be carried out in one or more steps. It is to be understood that mixtures of organic polyols may be used in place of a single polyol and, similarly, that mixtures of organic diisocyanates may be employed instead of a single diisocyanate.

The free isocyanate content of these water-foamable compositions will, of course, vary with the contemplated use for the resulting cellular material. In general, the free isocyanate content may range from about 3 to 25%, with the preferred range being from about 7 to 17%. In addition these compositions should have a Brookfield viscosity at 30° C. of not greater than about 400,000 centipoises. When the 30° C. Brookfield viscosity of the composition exceeds 400,000, the composition is too viscous to handle conveniently in existing equipment.

Representative organic polyisocyanates which may be used to prepare these water-foamable compositions include compounds such as toluene-2,4-diisocyanate,
1,5-naphthalenediisocyanate,
cumene-2,4-diisocyanate,
4-methoxy-1,3-phenylenediisocyanate,
4-chloro-1,3-pheneylenediisocyanate,
4-bromo-1,3-pheneylenediisocyanate,
4-ethoxy-1,3-pheneylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3-dimethyl-4,4'-diisocyanatodiphenylmethane,
2,6-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-napthalenediisocyanate, and
2,6-diisocyanatobenzfuran It is to be understood that mixtures of two or more different polyisocyanates may be employed.

The compounds containing a plurality of hydroxyl groups which may be reacted with these organic polyisocyanates include compounds such as polyalkyleneether glycols, polyalkyleneether-thioether glycols, polyalkylene-aryleneether glycols, polyaliphatic hydrocarbon diols, polyester polyols, glycerine, and fatty acid triglycerides having a hydroxyl number of at least about 49. These triglycerides may be either a naturally occurring oil, such as castor oil, or may be a blown drying oil of the type known in the trade as "heavy bodied" oils, such as blown linseed, tung, poppyseed, hempseed, soya oils and the like. In addition, compounds such as tetrols which are obtained by reacting ethylenediamine with ethylene and propylene oxide may be used. It is to be understood that two or more different polyols may be used to react with the organic polyisocyanate.

The useful polyalkyleneether glycols may be represented by the formula HO(RO)$_n$H where R is an alkylene radical containing up to 10 carbon atoms and $n$ is an integer sufficiently large that the molecular weight of the polyalkyleneether glycol is about 750 to 10,000. Not all of the alkylene radicals need be the same. When resilient foams are prepared the preferred polyalkyleneether glycols have molecular weights ranging from about 1,000 to 4,000; when rigid foams are made, the preferred polymeric glycols have molecular weights ranging from about 750 to 1,000. Representative examples of these glycols are poly-1,2-propyleneether glycol, 1,2-polydimethylethyleneether glycol, ethylene oxide-modified poly-1,2-propyleneether glycol, polytetramethyleneether glycol, polypentamethyleneether glycol, and polytetramethyleneformal glycol. These polyalkyleneether glycols are made by the polymerization of cyclic ethers such as alkylene oxides or dioxolane or by condensation of the glycols.

The polyalkyleneether-thioether glycols may be represented by the formula HO(GY)$_n$H, wherein G represents hydrocarbon radicals at least some of which are alkylene, Y represents chalcogen atoms some of which are sulfur and the rest oxygen, and $n$ is an integer sufficiently large so that the glycol has a molecular weight of about 750 to 10,000.

The polyalkylene-arylene glycols are similar to the polyalkyleneether glycols except that some arylene radicals are present. The phenylene, naphthalene and anthracene radicals may be used with or without substituents such as alkyl or alkylene groups, and, in general, there should be at least one alkyleneether radical having a molecular weight of about 500 for each arylene radical which is present. When part of the ether oxygens are replaced with sulfur, a polyalkylene-aryleneether-thioether glycol results, which also may be used in the present invention.

Polyalkyleneethers having three or more hydroxyl groups may also be used. These compounds may be obtained by condensing ethylene or propylene oxide, or mixtures thereof, with an aliphatic polyol such as trimethylolpropane, glycerol, pentaerythritol, etc.

Still another useful class of compounds are the polyaliphatic hydrocarbon diols. The aliphatic portion of these polymers may be saturated or there may be chain and side-chain ethylenic unsaturation present.

The polyesters containing a plurality of hydroxyl groups which are useful in the present invention are made by the usual methods of condensation polymerization from polyols and dicarboxylic acids. When resilient foams are desired, the polyester glycol is prepared from a diol and a dicarboxylic acid (e.g., 1,4-butanediol and adipic acid); optionally a small amount of a triol (e.g., trimethylolpropane) may be included to provide cross-linking; one molar equivalent of triol for each 3,000 to 12,000 molecular weight of polyester is recommended. When rigid foams are desired, the polyester polyol is prepared from a polyhydric compound (containing at least 3 alcoholic hydroxyl groups) and a dicarboxylic acid; optionally, a small amount of a diol (e.g., ethylene glycol) may be included.

For purposes of the present invention, it is preferred to use a polytetramethyleneether glycol having a molecular weight of about 3,000 for the formation of a resilient foam. When a more rigid foam is desired, it is preferred to use a mixture of polyols comprising a polypropyleneether glycol of molecular weight about 1,000, castor oil and glycerine.

The water-foamable polyisocyanate-polyurethane composition is prepared under anhydrous conditions. The reaction vessel is carefully dried before use. The reaction mixture itself is protected from atmospheric water vapor by a slow sweep of dry nitrogen or by attachment of drying columns to the exit vent of the reaction vessel. The reactants are agitated at a temperature between about 60° C. and 100° C. The time needed for completion of the reaction will depend on the temperature selected. In general, about 1 to 2 hours is sufficient at 100° C. If desired, the reaction may be carried out in several steps—one or more of which may produce hydroxyl-terminated polyurethanes prior to the final step. It is to be understood that the overall ratio of the number of free isocyanate groups to the number of alcoholic hydroxyl groups should be greater than 1.

When preparing the cellular materials from the water-foamable polyisocyanate-polyurethane compositions, it is generally desirable to employ a catalyst. These catalysts may be selected from a wide variety of tertiary amines, such as N-methyl morpholine, triethylamine, diethylethanolamine, and diethanolamine. It is to be understood that mixtures of two or more different catalysts may be used and that in some instances, it may be desirable to use a buffered catalyst. The use of a buffered catalyst is generally preferred when making a semi-rigid foam. The catalyst may be buffered by partially neutralizing it with a strong mineral acid, such as hydrochloric acid. For purposes of the present invention, the use of N-methyl morpholine, alone or in combination with triethylamine, is preferred for the formation of resilient foams; and the buffered catalyst system which is preferred is a 50% aqueous solution of a 2:1 molar ratio of diethyl ethanolamine hydrochloride and diethyl ethanolamine.

When preparing the improved cellular materials of the present invention, the water-soluble organo-silicone polymer is added to the water-foamable polyisocyanate-polyurethane composition at any time prior to the formation of the foam. The water-soluble organo-silicone polymers which are useful in the present invention are block polymers which may be obtained by condensing a polyalkoxy polysilane with the monoether of a polyalkyleneether glycol in the presence of an acid catalyst. The significant thing about these block polymers is the fact that they are water-soluble. For the purposes of the present invention they should have a molecular weight of from about 2,800 to about 6,000. These block polymers may be further described as being soft, low-melting waxes or viscous fluids.

The water-soluble organo-silicone block polymer has the structure
wherein R is a lower alkyl radical; R' is selected from the group consisting of hydrogen and methyl; R" is a lower alkyl radical; $a$ is an integer having a value of 1 to 3; $b$ is $$R-Si\left[-O\left(\begin{array}{c}CH_3\\|\\Si-O\\|\\CH_3\end{array}\right)_n\left(\begin{array}{c}R'\\|\\CH-CH_2-O\end{array}\right)_m R''\right]_a\left[-O\left(\begin{array}{c}R'\\|\\CH-CH_2-O\end{array}\right)_m R''\right]_b$$

an integer having a value of 0 to 2; with the proviso that $a+b=3$; $n$ is an integer having a value so that the molecular weight of the block of recurring siloxane units is not greater than about 1500; $m$ is an integer having a value so that the molecular weight of the block of recurring oxyalkylene units ranges from about 750 to 2,000; with the proviso that at least half the weight of the said oxyalkylene units shall be made up of oxyethylene units. It is preferred that about three-fourths of the total weight of the organo-silicone polymer be supplied by the oxyalkylene units.

These water-soluble organo-silicone polymers are prepared by reacting three molecules of the monoether of a polyalkyleneether glycol

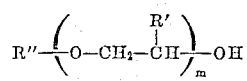

with a polysiloxane

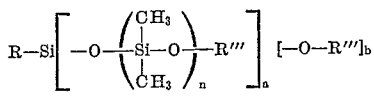

wherein R''' is a lower alkyl radical and R, R' R'', $a$, $b$, $m$ and $n$ have the significance defined above, in the presence of an acid catalyst. The condensation occurs with loss of the alcohol R''' OH. The following equation illustrates a typical reaction:

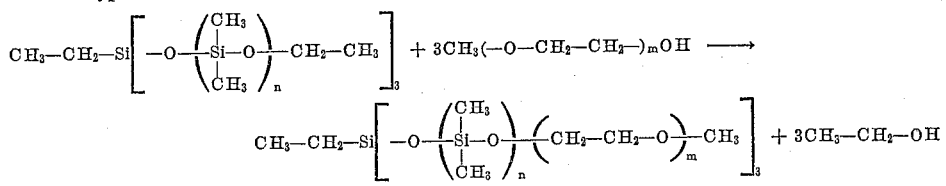

The reaction is carried out in a solvent such as toluene in which the reactants are mutually soluble. The reaction temperature should not exceed the reflux temperature of the solution to avoid side reactions. The catalyst may be an organic acid such as acetic acid or trifluoroacetic acid; about 0.1% by weight of the reactants is sufficient. The progress of the reaction can be followed by measuring the weight of distillate. After the reaction has been completed, the acid must be neutralized. Solid sodium bicarbonate may be used.

The polyalkoxy polysiloxane

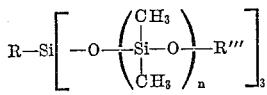

is made by equilibrating a trialkoxysilane with a polysiloxane such as the cyclic trimer or cyclic tetramer in the presence of an alkaline catalyst. The higher the proportion of the polysiloxane to the trialkoxysilane, the higher the molecular weight of the polyalkoxy polysiloxane.

These water-soluble organo-silicone block polymers are described in U.S. Patent 2,934,748.

When preparing the cellular material from the water-foamable polyisocyanate-polyurethane composition to which has been added the water-soluble organo-silicone polymer, enough water should be added to react with all of the free isocyanate groups. In general, one mole of water is needed for every two free isocyanate groups. Usually it is desirable to add from about 100 to 200% of the water required with the preferred amount being about 120%. It is to be understood that by free isocyanate groups is meant those that are available to react with the water.

The use of the water-soluble organo-silicone polymers in the process of preparing a cellular material from a water-foamable polyisocyanate-polyurethane composition results in a material having an unexpected increase in discrete closed cell content. In addition, the use of these water-soluble polymers provides a much stronger foam, as is evident by the increase in load-bearing capacity of both resilient and rigid foams. The cellular materials produced by the present invention have a wide variety of applications. The resilient products are useful for upholstery, mattresses, clothing liners and rug-backing. The rigid products are useful for thermal insulation and acoustical tile.

The following examples will better illustrate the nature of the present invention; however, the invention is not intended to be limited to these examples. Parts are by weight unless otherwise indicated.

The measurements on the properties of the cured foams are made in accordance with the following ASTM methods: compression set by ASTM D-395-59T, Method B; compression deflection by ASTM D-575-46, Method B.

The tensile strength measurements are carried out with an "Accrometer" (Scott Testers Co.) set for a 100-pound load. The foam specimens are cemented to aluminum plugs which contain stems gripped by the testing machine. The samples are drawn at a head speed of 2 inches per minute.

The heat distortion test measures the ability of a foam to carry a dead weight at elevated temperatures. It consists of subjecting a 3" x 3" x 1" foam slice to a load of 100 grams on 1 square inch of its surface for 24 hours at 150° C. The heat distortion is the permanent set at the end of 24 hours exposure.

The closed cell content of the foams is measured by an apparatus which operates on the principle of Boyle's law. It makes use of the fact that when two systems contain equal volumes of air, equal pressure drops will occur in both systems if the volume of each is changed by the same amount. Conversely, if one of the systems contains a greater volume of air than the other, unequal pressure drops will occur in the systems if the volume of each is changed by the same amount.

In the examples, Polymer A is a water-soluble organosilicone polymer prepared by the following procedure:

(a) 100 parts of mixed cyclic dimethyl polysiloxanes containing about 22% of the tetramer, 20% of the pentamer, and 50% of higher cyclic polymers, 14.3 parts of ethyltriethoxysilane, and 0.04 part of powdered potassium hydroxide are agitated at 150° C. for about 4 hours. The pressure is then reduced to about 50 mm. Hg and volatile fractions removed. The viscous residue (the triethoxypolydimethylsiloxane) is an oil having a number average molecular weight of about 1,500.

(b) 100 parts of the mono-n-butyl ether of polyethyleneether-propyleneether glycol (a block polymer having 50% by weight oxyethylene units and 50% by weight oxypropylene units) having a molecular weight of about 1,530 and 85 parts of toluene are heated together while agitated. A toluene-water azeotrope is distilled off. Then 32.6 parts of the triethoxy polydimethylsiloxane prepared in (a) above and 0.19 part of the trifluoroacetic acid are added to the reactor and the mixture is heated to 120° C. 2.95 parts of ethanol in a toluene-ethanol azeotrope is collected. The reaction mixture is cooled to about 100° C. and 0.65 part of sodium carbonate is added with stirring to neutralize the acid. The toluene is distilled off under vacuum and the residual organosilicone is filtered to remove the sodium trifluoroacetate and excess sodium bicarbonate. Polymer A is a viscous water-soluble oil.

Polymer B is prepared as follows:

(c) 100 parts of mixed cyclic dimethyl polysiloxanes containing about 22% of the tetramer, 20% of the pentamer, and 56% of higher cyclic polymers, 27.3 parts of ethyl triethoxysilane, and 0.04 part of powdered potassium hydroxide are agitated at 150° C. for about 4 hours. The pressure is then reduced to about 50 mm. Hg and volatile fractions are distilled off. The triethoxy polydimethyl siloxane which remains behind has a number average molecular weight of about 800.

(d) 100 parts of the monomethylether of polyethyleneether glycol having a molecular weight of about 750 and 35 parts of toluene are heated together while agitated. A toluene-water azeotrope is distilled off. Then 36.9 parts of the above triethoxy polydimethylsiloxane prepared in (c) above and 1.25 parts of trifluoroacetic acid are introduced. The temperature is adjusted to 120° C. and a toluene-ethanol azeotrope (B.P. 78 to 90° C.) is collected. The reaction mixture is then cooled to about 100° C. and 0.4 part of sodium bicarbonate is introduced with stirring. The toluene is stripped off under vacuum and the organo-silicone remaining behind is filtered to remove the inorganic matter. Polymer B thus obtained is a soft solid melting at about 33° C.

EXAMPLE 1

(A) *Preparation of Isocyanate-Terminated Polymer Composition*

3,000 parts of polytetramethyleneether glycol of number-average molecular weight about 3000 (moisture content less than 0.05% by weight) and 348 parts of toluene-2,4-diisocyanate are agitated at 90° C. for one hour in a dry reaction vessel protected from atmospheric moisture. The isocyanate-terminated polytetramethyleneether polyurethane polymer obtained is diluted at 90° C. with 575 parts of toluene-2,4-diisocyanate. The resultant mixture is heated to 140° C. and agitated at 140° C. for one hour. The mass is subsequently cooled to about 60° C. in about 1 hour and standardized to 9.5% free isocyanate content by the addition of 157 parts of toluene-2,4-diisocyanate.

(B) *Foaming of Polymer Composition*

(1) 100 parts of the polymer composition prepared above is vigorously mixed with 0.4 part of Polymer B. Then 2.4 parts of water and 1.0 part of N-methyl morpholine are introduced. The mass is insensively stirred for about 30 seconds and subsequently poured into a wax-lined mold. The foaming mixture fills the mold in about 4.5 minutes. The resilient foam obtained is cured at 90° C. for 16 hours at 100% relative humidity. Finally, it is heated in a dry oven at 100° C. for 1 hour. The properties of the cured foam are given below in Table I.

(2) A control experiment is carried out exactly as described in (1) above except that 1.0 part of polydimethylsiloxane (Dow Corning DC-200) having a viscosity of 50 centistokes is substituted for Polymer B. The properties of the cured foam are given below in Table I.

TABLE I

| Property | Silicone foaming additive present | |
|---|---|---|
| | (1%) Polydimethylsiloxane | (0.4%) Polymer B |
| Density (lbs./cu. ft.) | 2.9 | 2.9 |
| Cell structure | (1) | (1) |
| (70° C.) Compression set (percent) | 32 | 12 |
| (25° C.) Compression deflection (lb./sq. in.) to— | | |
| 10% | 0.25 | 1.05 |
| 20% | 0.57 | 1.30 |
| 30% | 0.70 | 1.45 |
| 40% | 0.80 | 1.6 |
| 50% | 0.97 | 2.1 |
| 60% | 1.20 | 2.7 |
| 70% | 1.65 | 3.9 |
| 80% | 2.75 | 8.5 |

1 Fine, irregular.

EXAMPLE 2

(A) 94.1 parts of the isocyanate-terminated polymer prepared in Example 1-A above, 5.9 parts of a toluene diisocyanate isomer mixture (80% 2,4- and 20% 2,6-isomer), 5 parts of dioctyl sebacate as a plasticizer, and 0.6 part of Polymer B are agitated together for 1 minute. Then 0.54 part of diethyl ethanolamine, 0.36 part of triethylamine, and 3.0 parts of water are introduced. The mass is intensively stirred for about 30 seconds and the resulting mixture is poured into a wax-lined mold. The expansion is complete in 3 minutes. The foam obtained is stripped from the mold, heated at 100° C. for 1 hour to remove residual triethylamine, cured at 100° C. for 2 hours at 50% relative humidity, and finally dried for 1 hour at 100° C. The properties of the resilient foam are given below in Table II.

(B) A control experiment is carried out exactly as described in A above except that 1.1 parts of polydimethylsiloxane (Dow Corning DC-200) having a viscosity of 50 centistokes is substituted for Polymer B. The properties of the resilient foam are given below in Table II.

TABLE II

| Property | Silicone foaming additive present | |
|---|---|---|
| | (1.1%) Polydimethylsiloxane | (0.6%) Polymer B |
| Density (lb./cu. ft.) | 2.1 | 2.2 |
| (70° C.) Compression set (percent) | 81 | 46 |
| (25° C.) Compression deflection (lb./sq. in.) to— | | |
| 10% | 0.14 | 0.33 |
| 20% | 0.26 | 0.51 |
| 30% | 0.30 | 0.59 |
| 40% | 0.35 | 0.68 |
| 50% | 0.43 | 0.76 |
| 60% | 0.55 | 0.89 |
| 70% | 0.80 | 1.21 |
| 80% | 1.45 | 1.95 |

EXAMPLE 3

(A) 92.5 parts of the isocyanate-terminated polymer of Example 1-A, 7.5 parts of a toluene diisocyanate isomer mixture (80% 2,4- and 20% 2.6-isomer) and 0.6 part of Polymer B are thoroughly stirred together for 1 minute. Then 0.55 part of diethyl ethanolamine, 0.36 part of triethylamine, and 3.12 parts of water are introduced. The resulting mixture is vigorously agitated for about 30 seconds. It is then poured into a paraffin-lined mold. The mass expands for 3.5 minutes to fill the mold with a low density resilient foam which is subsequently removed from the mold and cured at 90° for 16 hours at 100% relative humidity to obtain the properties given below in Table III.

(B) A control experiment is carried out as described above except that 1.1 parts of polydimethylsiloxane (Dow Corning DC-200) having a viscosity of 50 centistokes is substituted for Polymer B. The foaming mass collapsed.

TABLE III

| Property | Silicone foaming additive present | |
|---|---|---|
| | (1.1%) Polydimethylsiloxane | (0.6%) Polymer B |
| Density (lb./cu. ft.) | Collapsed | 2.4 |
| (70° C.) Compression set (percent) | | 16 |
| (25° C.) Compression deflection (lb./sq. in.) to— | | |
| 10% | | 0.63 |
| 20% | | 0.86 |
| 30% | | 0.93 |
| 40% | | 0.97 |
| 50% | | 1.05 |
| 60% | | 1.20 |
| 70% | | 1.89 |
| 80% | | 2.35 |

EXAMPLE 4

(A) *Preparation of Isocyanate-Terminated Polymer Composition*

1600 parts of castor oil (water content less than 0.1%) and 2400 parts of a toluene diisocyanate isomer mixture (80% 2,4- and 20% 2,6-isomer) are agitated in a dry reaction flask protected from atmospheric moisture.

When the temperature begins to fall, external heat is applied. The reactants are brought to 120° C. and agitated at 120° C. for 3 hours. The polymer composition obtained has a free isocyanate content of about 22.4%.

(B) *Foaming of Polymer Composition*

(1) 100 parts of the polymer composition prepared above, 15 parts of tetra(2-hydroxy propyl)ethylenediamine, 0.25 part of a polyoxyethylated vegetable oil, and 0.25 part of Polymer B are stirred together until heat evolution begins. Then 3 parts of water and 0.5 part of N-methyl morpholine are introduced. The mixture is stirred vigorously for 15 seconds and subsequently poured into a wax-lined mold. The mass expands for 3 minutes and becomes tack-free in about 10 minutes. The properties of the plastic foam obtained are given below in Table IV.

(2) A control experiment is carried out exactly as described in (1) above except that 0.75 part of polydimethylsiloxane (Dow Corning DC-200) having a viscosity of 50 centistokes is substituted for Polymer B. The properties of the plastic foam obtained are given below in Table IV.

TABLE IV

| Property | Silicone foaming additive present | |
|---|---|---|
| | (0.75%) Polydimethylsiloxane | (0.25%) Polymer B |
| Density (lb./cu. ft.) | 1.7 | 1.9 |
| Closed cells (percent) | 17 | 71 |
| Tensile strength (lb./sq. in.) | 38 | 53 |
| (25° C.) Compression deflection (lb./sq. in.) to— | | |
| 10% | 14.0 | 25.0 |
| 25% | 14.4 | 25.2 |
| 50% | 15.7 | 34.2 |

EXAMPLE 5

(A) *Preparation of Isocyanate-Terminated Polymer Composition*

85 parts of castor oil having a hydroxyl number of about 165, 15 parts of polyethylene glycol of molecular weight 200, and 100 parts of toluene-2,4-diisocyanate are mixed together in a dry reactor protected from atmospheric moisture. Heat is evolved and the temperature rises to 120° C. in about 15 minutes. When the temperature begins to fall, the batch is adjusted to 100° C. and agitated at 100° C. for 1.5 hours. The polymer is collected at about 60° C. The polymer has a free isocyanate content of about 14.5% and a Brookfield viscosity at 30° C. of about 8500 cps.

(B) *Foaming of Polymer Composition*

(1) 100 parts of the composition prepared above is thoroughly mixed with 0.5 part of Polymer A. Then 7.2 parts of a 50% aqueous solution of a 2:1 molar ratio mixture of diethylethanolamine hydrochloride and diethylethanolamine are added. The mass is vigorously agitated for about 45 seconds and the resulting mixture is poured into a wax-lined box. The mass expands to fill the box with a fine-celled plastic foam whose properties are given below in Table V.

(2) A control experiment is carried out exactly as described in (1) above except that 0.5 part of polydimethylsiloxane (Dow Corning DC-200) having a viscosity of 50 centistokes is substituted for Polymer A.

(3) A further control experiment is carried out exactly as described in (1) above except that no silicone additive is used.

TABLE V

| Property | Additive used | | |
|---|---|---|---|
| | None | (0.5%) Polydimethylsiloxane | (0.5%) Polymer A |
| Density (lb./cu. ft.) | 2.1 | 1.9 | 1.7 |
| Percent closed cells | 6 | 0 | 31 |
| (25° C.) Compression deflection (lb./sq. in.) to 25% | 7.2 | 6.9 | 19.7 |

EXAMPLE 6

(A) *Preparation of Polymer Composition*

760 parts of a polyester having a hydroxyl number of about 380 (commercially available from the Reichold Chemical Company as "Polylite" 8600), at a temperature above 60° C., is slowly added with stirring to 2550 parts of an isomer mixture of toluene diisocyante (80% 2,4- and 20% 2,6-isomer) contained in a reactor protected from atmospheric moisture. A temperature rise to about 120° C. occurs. When the temperature subsequently falls below 100° C., external heat is applied. The reactants are brought to 100° C. and agitated at 100° C. for 2 hours. The polymer obtained has a Brookfield viscosity of 12,960 at 25° C.

(B) *Foaming of Polymer Composition*

(1) 50 parts of the polymer composition prepared in A above, 50 parts of the polyester used in A above, 1 part of a non-ionic emulsifying agent made from polyoxyethylene sorbitan monopalmitate, and 0.5 part of Polymer B are vigorously mixed together for 1 minute. Then 0.5 part of dimethanolamine and 3.0 parts of water are introduced. The mass is intensively agitated for about 30 seconds and the resulting mixture is poured into a wax-lined mold. The expanding foam rises for about 3.3 minutes and becomes tack-free in about a half minute. The properties of the foam obtained are given below in Table VI.

(2) A control experiment is carried out exactly as described in (1) above except that Polymer B is omitted. The properties of the foam obtained are shown in Table VI below.

TABLE VI

| Property | Polymer B absent | (0.5%) Polymer B present |
|---|---|---|
| Density (lb./cu. ft.) | 2.2 | 2.0 |
| Cell structure | Fine | Very fine |
| (25° C.) Compression deflection (lb./sq. in.) to— | | |
| 25% | 27.0 | 38.5 |
| 50% | 32.7 | 42.0 |

EXAMPLE 7

(A) *Preparation of Polymer Composition*

58.14 parts of toluene-2,4-diisocyanate is poured into a dry reactor which is protected from atmospheric moisture. Agitation is begun, the mass is heated to 40° C., and treated by addition of 18.44 parts of castor oil of molecular weight 1023 and 16.89 parts of polytetramethylene-ether glycol of molecular weight 937. When a slight exothermic reaction is over, the mixture is heated to 100° C. over an hour period. The reactants are agitated for 3 hours at 100° C. Subsequently 6.52 parts of glycerine (0.2% water content) is added in a narrow stream over a 2½ hour period. The reaction mixture is kept at about 105° C. during this addition. The mass is finally cooled to about 75° C. and collected under nitrogen. The polymer obtained has a 15.0% free isocyanate content. It has a Brookfield viscosity of 400,000 cps. at 30° C.; 54,000 cps. at 50° C.; 9,000 cps. at 70° C.

(B) Foaming of Polymer Composition (1) 100 parts of the polymer composition prepared in A above is heated to about 45° C. Then 7.2 parts of a 50% aqueous solution of a 2:1 molar ratio mixture of diethylethanolamine hydrochloride and diethylethanolamine is introduced and the resulting mixture is strongly agitated for about 30 seconds. The foaming mass is poured into a paraffin-lined form where it continues to expand for about 2.6 minutes. The rigid foam obtained is tack-free in about 15 minutes. Its properties are given below in Table VII-A.

(2) 100 parts of the polymer composition prepared in A above is heated to about 45° C. Then 0.5 part of Polymer A and 7.2 parts of a 50% aqueous solution of a 2:1 molar ratio mixture of diethylethanolamine hydrochloride and diethylethanolamine are added. The mixture is thoroughly agitated for about 30 seconds and subsequently poured into a paraffin-lined form. In about 3 minutes the expansion is completed. The rigid foam obtained is tack-free in about 15 minutes. Its properties are given below in Table VII-A.

TABLE VII-A

| Property | Polymer A absent | Polymer A (0.5%) present |
|---|---|---|
| Density (lbs./cu. ft.) | 1.75 | 1.74 |
| Cell structure | Medium | Very fine |
| Linear shrinkage | Nil | Nil |
| (25°C.) Compression deflection (lb./sq. in.) to— | | |
| 25% | 7.7 | 18.5 |
| 50% | 10.4 | 22.5 |

(3) 100 parts of the polymer composition prepared in A above is heated to about 40° C. Then 7.2 parts of a 50% aqueous solution of a 2:1 molar ratio mixture of diethylethanolamine hydrochloride and diethylethanolamine is introduced and the resulting mixture is strongly agitated for 30 seconds. The expanding mass is poured into a paraffin-lined form where it continues to rise for about 2 minutes. The rigid foam obtained is tack-free in about 15 minutes. Its properties are given below in Table VII-B.

(4) 100 parts of the polymer composition prepared in A above is heated to about 45° C. Then 0.5 part of Polymer A and 7.2 parts of a 50% aqueous solution of a 2:1 molar ratio mixture of diethylethanolamine hydrochloride and diethylethanolamine are introduced. The mass is vigorously agitated for 30 seconds and the resulting mixture is subsequently poured into a paraffin-lined box. The foaming is complete in about 2¼ minutes. The rigid foam obtained is tack-free in about 22 minutes. Its properties are given below in Table VII-B.

TABLE VII-B

| Property | Polymer A absent | Polymer A present (0.5%) |
|---|---|---|
| Density (lbs./cu. ft.) | 2.2 | 1.4 |
| Cell structure | (1) | (2) |
| Linear shrinkage (percent) | Nil | Nil |
| (25° C.) Compression deflection (lbs./sq. in.) to— | | |
| 25% | 12.6 | 16.5 |
| 50% | 22.0 | 19.2 |
| Tensile strength (lbs./sq. in.) | 22.6 | 35.1 |

1 Fine, irregular.
2 Very fine, regular.

EXAMPLE 8

(A) *Preparation of 1,4-Butanediol/Adipic Acid Polyester*

549.4 parts of 1,4-butanediol is heated with 664.3 parts of adipic acid under a nitrogen stream. Complete solution occurs at about 130° C. Agitation is then begun. The temperature is raised to 170° C. and the reactants are agitated for 16 hours at 170–180° C. Approximately 162 parts of water is evolved and collected during this period. The mass is heated an additional 48 hours at 180° C. and dried for 16 hours at 180° C. (10–15 mm. Hg). The product is an oil analyzing for a hydroxyl number of 92 and an acid number of 0.1. These data indicate that the polyester glycol has a number-average molecular weight of 1210.

(B) *Preparation of the Polymer Composition*

175 parts of the 1,4-butanediol/adipic acid polyester prepared above and 185 parts of castor oil of molecular weight 1035 are charged into a dry reactor which is protected against atmospheric moisture. Agitation is begun and 576 parts of toluene-2,4-diisocyanate is introduced. The temperature rises to about 70° C. When the temperature begins to drop, heat is applied and the mixture is brought to 100° C. in about a half hour and subsequently maintained at 100° C. for 3 hours. It is then heated to about 102° C. and treated by addition of 64.8 parts of glycerine (0.2% water content) in a thin stream over a 2-hour period. During this time the reaction temperature is kept at about 105° C. The mixture is then allowed to cool while agitated to 80° C. over an hour period. The polymer is collected at about 75° C. It analyzes for a 15.3% free isocyanate content.

(C) *Foaming of Polymer Composition*

(1) 100 parts of the polymer composition prepared in B above is heated to about 60° C. Then 7.2 parts of a 50% aqueous solution of a 2:1 molar ratio mixture of diethylethanolamine hydrochloride and diethylethanolamine is introduced and the mixture is vigorously agitated for 20 seconds. The foaming mass is poured into a paraffin-lined form where it continues to expand for 2 minutes. The rigid foam obtained is tack-free in about 5 minutes. Its properties are given below in Table VIII.

(2) 100 parts of the polymer composition prepared in B above is heated to about 60° C. Then 0.5 part of Polymer A and 7.2 parts of a 50% aqueous solution of a 2:1 molar ratio mixture of diethylethanolamine hydrochloride and diethylethanolamine are introduced. The mixture is strongly agitated for 20 seconds and the foaming mass is subsequently poured into a paraffin-lined form where it continues to rise for a little over 2 minutes. The rigid foam obtained is tack-free in about 5 minutes. Its properties are given below in Table VIII.

TABLE VIII

| Property | Polymer A absent | (0.5%) Polymer A present |
|---|---|---|
| Cell structure | Medium | Fine |
| Percent linear shrinkage | Nil | 1.5 |
| Density (lbs./cu. ft.) | 1.7 | 1.9 |
| Compression deflection (lbs./sq. ft.) (25° C.) to— | | |
| 25% | 8.2 | 16.9 |
| 50% | 10.0 | 21.2 |

EXAMPLE 9

(A) *Preparation of Polymer Composition*

585 parts of polypropylene glycol of molecular weight 1025 and 600 parts of castor oil (hydroxyl number of about 165) are agitated for 2 hours at 100° C. with 1900 parts of mixed isomers of toluene diisocyanate (80% 2,4- and 20% 2,6-). The reactor is protected from atmospheric moisture. The temperature is raised to 105° C. and 210 parts of synthetic glycerine are added in a thin stream over a 2-hour period. During this addition, the temperature is kept between 105 and 115° C. The polymer composition is collected at about 75° C. It has a free isocyanate content of 15.0% and a Brookfield viscosity of 67,000 cps. at 45° C., 30,000 cps. at 55° C., and 3,950 cps. at 75° C.

(B) Foaming of Polymer Composition (1) 100 parts of the polymer composition prepared in A above at 60° C. and 0.5 part of Polymer A are agitated together for 1 minute. Then 4.8 parts of a 50% aqueous solution of a 2:1 molar ratio mixture of diethylethanolamine hydrochloride and diethylethanolamine, and 1.2 parts of water are introduced. The mass is stirred for about 15 seconds and is subsequently poured into a paraffin-lined mold. The mixture expands to fill the mold with a tough plastic foam whose properties are assembled below in Table IX.

(2) A control experiment is carried out exactly as described in (1) above except that Polymer A is not used. The properties of the foam are given in Table IX.

TABLE IX

| Property | Polymer A absent | Poylmer A present |
|---|---|---|
| Density (lb./cu. ft.) | 1.8 | 1.7 |
| Closed cells (percent) | 8 | 51 |
| Tensile strength (lbs./sq. in.) | 10.2 | 23.5 |
| (25° C.) Compression deflection (lbs./sq. in.) to— | | |
| 25% | 7.8 | 16.8 |
| 50% | 10.7 | 19.6 |
| Heat distortion at 150° C. (percent) | 14.5 | 6.5 |

As many widely different embodiments of this invention may be made without departing from the spirit and scope thereof, it is to be understood that this invention is not limited to the specific embodiments thereof except as defined in the appended claims.

What is claimed is:

1. In the process for the formation of a cellular material from the reaction of water with a water-foamable polyisocyanate polyurethane composition having a free isocyanato content of from about 3.0 to 25.0% by weight, said polyurethane composition being obtained by reacting an organic polyisocyanate with an organic compound containing a plurality of alcoholic hydroxyl groups with the proportions of reactants being such that the ratio of the number of free isocyanato groups to the number of alcoholic hydroxyl groups is greater than one, said organic compound being selected from the group consisting of polyalkyleneether glycols, polyalkyleneether - thioether glycols, polyalkylene - aryleneether glycols, polyalkylene-aryleneether-thioether glycols, polyalkyleneethers having at least three hydroxyl groups, polyester polyols prepared from polyhydric alcohols and dicarboxylic acids, glycerine, fatty acid triglycerides having a hydroxyl number of at least about 49, and tetrols prepared by reacting ethylene diamine with ethylene oxide and propylene oxide, the improvement comprising mixing said polyurethane composition prior to the formation of the cellular material with from about 0.05 to 2.0% by weight of a water-soluble organo-silicone polymer having a molecular weight of from about 2,800 to 6,000 and having the structure

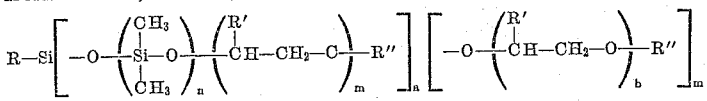

wherein R is a lower alkyl radical; R' is selected from the group consisting of hydrogen and methyl radicals; R'' is a lower alkyl radical; $a$ is an integer having a value of 1 to 3; $b$ is an integer having a value of 0 to 2; with the proviso that $a+b=3$; $n$ is an integer having a value so that the molecular weight of the block of recurring siloxane units is not greater than about 1500; $m$ is an integer having a value so that the molecular weight of the block of recurring oxyalkylene units ranges from about 750 to 2,000; with the proviso that at least half the weight of the said oxyalkylene units shall be made up of oxyethylene units.

2. The process of claim 1 wherein the organosilicone polymer is obtained by reacting three moles of a monomethylether of polyethyleneether glycol having a molecular weight of about 750 with one mole of a triethoxy polydimethylsiloxane having a molecular weight of about 800.

3. The process of claim 1 wherein the organosilicone polymer is obtained by reacting three moles of a monobutylether of polyethyleneether-propyleneether glycol having a molecular weight of about 1,500 with one mole of a triethoxy polydimethylsiloxane having a molecular weight of about 1,500.

4. The process of claim 1 wherein the water-foamable polyisocyanate-polyurethane composition is obtained from an organic polyisocyanate and a polyalkyleneether glycol having a molecular weight of from about 750 to 10,000.

5. The process of claim 4 wherein the polyisocyanate is toluene-2,4-diisocyanate and the polyalkyleneether glycol is a polytetramethyleneether glycol.

6. The process of claim 1 wherein the water-foamable polyisocyanate-polyurethane composition is obtained from an organic polyisocyanate and castor oil.

7. The process of claim 6 wherein the organic polyisocyanate is a toluene diisocyanate isomeric mixture consisting of 80% of the 2,4-isomer and 20% of the 2,6-isomer.

8. The process of claim 1 wherein the water-foamable polyisocyanate-polyurethane composition is obtained from an organic polyisocyanate, a polyalkyleneether glycol, castor oil and glycerine.

9. The process of claim 8 wherein the organic polyisocyanate is toluene-2,4-diisocyanate and the polyalkyleneether glycol is a polypropyleneether glycol.

10. The cellular materials obtained by the process of claim 1.

11. In a process for the formation of a cellular material from the reaction of water with a water foamable isocyanato terminated polyurethane composition, said polyurethane composition being obtained by reacting an excess of an organic polyisocyanate with a polyalkylene ether glycol, the improvement comprising mixing said polyurethane composition prior to the formation of said cellular material with from about 0.05 to 2.0% by weight of a water soluble organo-silicone polymer having the structure

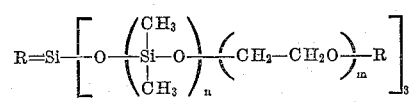

wherein R is a lower alkyl radical; $n$ is an integer having a value so that the molecular weight of the recurring siloxane units is not greater than about 544 to 1500 and $m$ is an integer having a value so that the molecular weight of the block of recurring oxyethylene units ranges from about 1320 to 2000.

References Cited in the file of this patent
UNITED STATES PATENTS

| 2,787,601 | Detrick et al. | Apr. 2, 1947 |
| 2,834,748 | Bailey et al. | May 13, 1958 |
| 2,842,506 | Roussel | July 8, 1958 |

FOREIGN PATENTS

| 729,523 | Great Britain | May 4, 1955 |
| 1,153,994 | France | Oct. 21, 1957 |

OTHER REFERENCES

Hopkins: "Rubber Age," volume 78, No. 2, page 240, November 1955.

Barringer: "Rigid Urethane Foams—11 Chemistry and Formulation" DuPont Elastomers Chemicals Dept. Bulletin HR–26; April 1958, pages 9 and 10.

UNITED STATES PATENT OFFICE
CERTIFICATE OF CORRECTION

Patent No. 3,145,185　　　　　　　　　　August 18, 1964

Ward J. Remington

It is hereby certified that error appears in the above numbered patent requiring correction and that the said Letters Patent should read as corrected below.

Column 1, line 39, after "has" insert -- as --; column 2, lines 36, 37 and 38, for "-pheneylenediisocyanate", each occurrence, read -- -phenylenediisocyanate --; column 4, lines 53 to 57, strike out the structure and insert the same after "the structure" in line 49, same column 4; column 5, line 41, for "2,934,748" read -- 2,834,748 --; column 8, line 32, for "2.6-isomer" read -- 2,6-isomer --; column 13, lines 57 to 60, the structure should appear as shown below instead of as in the patent:

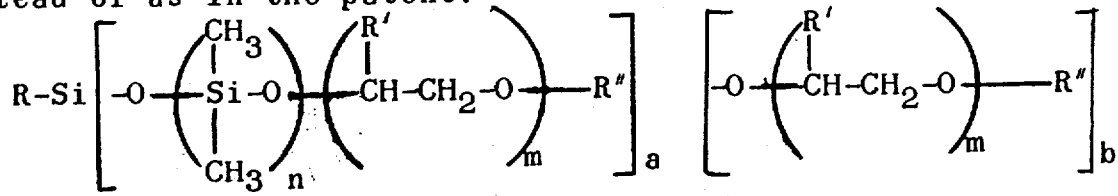

column 14, lines 45 to 49, the formula should appear as shown below instead of as in the patent:

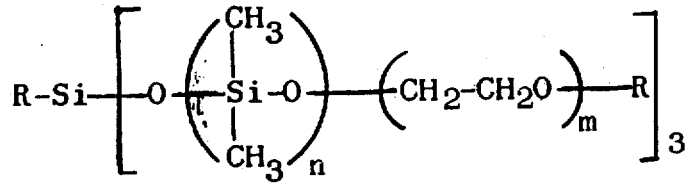

same column 14, line 63, for "Apr. 2, 1947" read -- Apr. 2, 1957 --.

Signed and sealed this 16th day of March 1965.

SEAL)
Attest:

ERNEST W. SWIDER　　　　　　　　　　EDWARD J. BRENNER
Attesting Officer　　　　　　　　　　Commissioner of Patents